(12) United States Patent
Ebihara et al.

(10) Patent No.: US 11,655,913 B2
(45) Date of Patent: May 23, 2023

(54) GROUNDED DIAPHRAGM WITH CONDUCTIVE LAYER

(71) Applicant: ASAHI YUKIZAI CORPORATION, Nobeoka (JP)

(72) Inventors: Hidenori Ebihara, Nobeoka (JP); Hiroaki Hidaka, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 18 days.

(21) Appl. No.: 17/601,226

(22) PCT Filed: Apr. 3, 2020

(86) PCT No.: PCT/JP2020/015350
§ 371 (c)(1),
(2) Date: Oct. 4, 2021

(87) PCT Pub. No.: WO2020/204169
PCT Pub. Date: Oct. 8, 2020

(65) Prior Publication Data
US 2022/0163137 A1 May 26, 2022

(30) Foreign Application Priority Data

Apr. 4, 2019 (JP) .............................. JP2019-071929

(51) Int. Cl.
*F16K 41/10* (2006.01)
*F16K 7/17* (2006.01)
*F16K 31/122* (2006.01)

(52) U.S. Cl.
CPC .............. *F16K 41/103* (2013.01); *F16K 7/17* (2013.01); *F16K 31/1221* (2013.01)

(58) Field of Classification Search
CPC ....... F16K 41/103; F16K 7/17; F16K 31/1221
See application file for complete search history.

(56) References Cited

U.S. PATENT DOCUMENTS 4,357,748 A * 11/1982 Branson ................. H01H 35/40
251/61.3
9,995,415 B2 * 6/2018 Imai ........................ F16L 9/125
(Continued)

FOREIGN PATENT DOCUMENTS

JP 2009-24749 A 2/2009
JP 2010-121689 A 6/2010
(Continued)

OTHER PUBLICATIONS

JP2018009667A, Machine Translation (Year: 2018).*
(Continued)

*Primary Examiner* — Daphne M Barry
(74) *Attorney, Agent, or Firm* — Manabu Kanesaka (57) ABSTRACT

A diaphragm valve includes: a valve main body having formed therein a valve chamber, and an inflow passage and an outflow passage being in communication with the valve chamber; an annular valve seat formed in the valve chamber; a diaphragm contacting and separating from the valve seat; and a drive unit driving the diaphragm. The drive unit has a drive unit housing attached to the valve main body so that an outer peripheral edge portion of the diaphragm is sandwiched between the valve main body and the drive unit housing, and the drive unit housing is formed of an electroconductive fluorine resin material.

11 Claims, 4 Drawing Sheets

(56) References Cited

U.S. PATENT DOCUMENTS

2015/0129791 A1* 5/2015 Okita .................. F16K 7/14
251/331
2018/0038505 A1* 2/2018 Imai .................. F16K 31/1266

FOREIGN PATENT DOCUMENTS

| JP | 4990118 B2 | 8/2012 |
|---|---|---|
| JP | 2018009667 A * | 1/2018 |
| JP | 2018-21639 A | 2/2018 |
| JP | 2018-173170 A | 11/2018 |

OTHER PUBLICATIONS

P2009-24749A, Machine Translation (Year: 2009).*
PCT/ISA/210, "International Search Report for International Application No. PCT/JP2020/015350," dated Jun. 16, 2020.
PCT/IB/338, "Notification of Transmittal of Translation of the International Preliminary Report on Patentability for International Application No. PCT/JP2020/015350," dated Oct. 14, 2021.
PCT/IB/373, "International Preliminary Report on Patentability for International Application No. PCT/JP2020/015350," dated Sep. 28, 2021.
PCT/ISA/237, "Written Opinion of the International Searching Authority for International Application No. PCT/JP2020/015350," Jun. 16, 2020.

* cited by examiner

GROUNDED DIAPHRAGM WITH CONDUCTIVE LAYER

RELATED APPLICATIONS

The present application is National Phase of International Application No. PCT/JP2020/015350 filed Apr. 3, 2020, and claims priority from Japanese Application No. 2019-071929, filed Apr. 4, 2019, the disclosure of which is hereby incorporated by reference herein in its entirety.

TECHNICAL FIELD

The present invention relates to a diaphragm valve used in various industries, such as chemical factories, a semiconductor manufacturing field, a liquid crystal manufacturing field, and a food field, and more specifically to a diaphragm valve that can suppress the electrostatic charge of a diaphragm.

BACKGROUND ART

Diaphragm valves are used in various fields such as chemical factories, a semiconductor manufacturing field, a liquid crystal manufacturing field, and a food field. In the diaphragm valve, generally, an inflow-side flow passage and an outflow-side flow passage are in communication with a valve chamber provided in the central part of the valve main body, a diaphragm part that separates the valve chamber from the internal space of a drive unit housing is sandwiched between the valve main body and the drive unit housing attached to an upper part of the valve main body, and the diaphragm part is connected to the lower end of a stem driven by a drive mechanism placed in the internal space of the drive unit housing, by which a valve element supported by the diaphragm part is pressed against and separated from a valve seat provided in the valve chamber to switch opening and closing between the inflow-side flow passage and the outflow-side flow passage.

When a fluid flows inside the this type of diaphragm valve, static electricity is generated due to friction between the fluid and the inner peripheral surface of the flow passage, the peripheral surface of the valve chamber, and the liquid contact surface of the diaphragm part. If the generated static electricity accumulates in the components of the diaphragm valve, discharge may cause a dielectric breakdown in the diaphragm part, which could cause the fluid in the valve chamber to pass through the diaphragm part and then to leak into the drive unit housing. In addition, static electricity makes it easier for particles such as impurities in the fluid to adhere to the inner peripheral surface of the flow passage, which could contaminate the flow passage.

In order to suppress the electrostatic charge of the components of this type of diaphragm valve, for example, PTL 1 proposes a diaphragm valve including a flow passage body made of an insulating material and having a fluid passage formed therein; and a membrane part made of an insulating material and having a fluid contact surface coming in contact with a fluid flowing in the fluid passage. In the diaphragm valve, a part of the periphery of the fluid passage is formed by a thin-walled part. There is a conductive layer formed on the outer peripheral surface of the thin-walled part and a charge-releasing means connected to the conductive layer, so that static electricity generated on the inner peripheral surface of the fluid passage is allowed to be released to the outside through the conductive layer and through the charge-releasing means.

CITATION LIST

Patent Literature

PTL1: Japanese Patent Publication No. 4990118

SUMMARY OF THE INVENTION

Technical Problem

In chemical factories, a semiconductor manufacturing field, a liquid crystal manufacturing field, a food field, and the like, there are handled fluids with strong corrosiveness and fluids that are required to prevent pollution, and therefore a fluorine resin material, which has excellent chemical resistance and stain resistance, is widely used for parts of a diaphragm valve that come into contact with a fluid. In addition, as described above, the diaphragm valve has a configuration in which the valve chamber and the space for housing the drive unit and stem for driving the diaphragm are separated from each other by the diaphragm part. However, damage to the diaphragm or the like may cause leak of the fluid in the valve chamber into the space for housing the drive unit. For this reason, it is preferable to form also the drive unit and the stem entirely from the fluorine resin material as much as possible.

On the other hand, the fluorine resin material has a high volume resistivity and is not able to sufficiently release static electricity, which is generated by friction with the fluid flowing inside the valve device, to the outside, by which static electricity tends to accumulate. Particularly, in the diaphragm valve, the flow velocity increases in a valve part that switches opening and closing between the two flow passages, and therefore static electricity tends to accumulate in the valve part and is easily electrically charged. In the valve chamber where the valve part is provided, areas such as corners where fluid stays are likely to be generated, and therefore fine particles such as impurities in the fluid are attracted to and adhere to the walls of the valve chamber and the diaphragm by the charged static electricity, thereby easily aggregating to be enlarged. The present inventors found that the enlarged particles adhering to the diaphragm are detached from the diaphragm and released into the fluid due to a vertical movement of the diaphragm or a sudden change in the flow velocity when the valve opens or closes and that it is a major cause of fluid contamination. In particular, the enlarged particles may damage a wafer during cleaning or the like in semiconductor wafer manufacturing or the like problematically. Even if the electrostatic charge of the liquid contact part of the valve main body is suppressed as in the diaphragm valve described in PTL 1, the suppression of the electrostatic charge of the diaphragm tends to be insufficient and similar problems may occur in the case where the diaphragm is formed of an insulating material.

Accordingly, an object of the present invention is to solve the problems existing in the prior art and to provide a diaphragm valve capable of suppressing the adhesion of particles to a diaphragm caused by the electrostatic charge and capable of reducing the fluid contamination caused by enlarged particles.

Solution to Problem

In view of the above-described object, the present invention provides a diaphragm valve including: a valve main body having formed therein a valve chamber, and a first flow passage and a second flow passage being in communication with the valve chamber; an annular valve seat formed in the valve chamber; a diaphragm contacting and separating from the valve seat; and a drive unit driving the diaphragm, the diaphragm contacting and separating from the valve seat to switch opening and closing between the first flow passage and the second flow passage, wherein the drive unit has a drive unit housing attached to the valve main body so that an outer peripheral edge portion of the diaphragm is sandwiched between the valve main body and the drive unit housing, the drive unit housing is formed of an electroconductive fluorine resin material, and the diaphragm includes a contact portion coming in contact with the valve seat and a residual portion, the contact portion being formed of a non-electroconductive fluorine resin material, the residual portion being formed of an electroconductive fluorine resin material.

In the above diaphragm valve, the outer peripheral edge portion of the diaphragm is sandwiched between the valve main body and the drive unit housing, and the drive unit housing that is not a liquid contact part is formed of electroconductive fluorine resin. Therefore, the static electricity generated in the diaphragm is allowed to escape to the drive unit housing, and electrostatic charge of the diaphragm is suppressed. This makes it difficult for fine particles such as impurities in the fluid to adhere to the diaphragm, thereby preventing the particles from growing to be enlarged. This consequently prevents enlarged particles adhering to the diaphragm from being released into the fluid due to a vertical movement of the diaphragm and a sudden change in the flow velocity when the valve opens or closes. Additionally, the drive unit housing is formed of an electroconductive fluorine resin material, and therefore even if damage to the diaphragm or the like causes leak of the fluid in the valve chamber through the diaphragm into the drive unit housing, the drive unit housing is able to be prevented from being corroded by the fluid. Furthermore, when the diaphragm is formed of an electroconductive fluorine resin material, the static electricity generated in the diaphragm is allowed to escape to the drive unit housing more easily, thereby enhancing the effect of suppressing the electrostatic charge. On the other hand, when the portion coming in contact with the valve seat is formed of a non-electroconductive fluorine resin material, it is possible to prevent a release of conductive materials from the diaphragm into the fluid even if particles are generated from the diaphragm by friction with the valve seat and released into the fluid. This is because the non-electroconductive fluorine resin material does not contain conductive materials such as carbon black and carbon nanotubes that are contained in an electroconductive fluorine resin material.

In the above diaphragm valve, preferably, the drive unit further includes a stem coupled to the diaphragm and a drive mechanism for driving the stem, and the stem is formed of an electroconductive fluorine resin material. More preferably, all of the components of the drive unit adjacent to the diaphragm are formed of an electroconductive fluorine resin material. If all of the components of the drive unit adjacent to the diaphragm, such as the stem coupled to the diaphragm, are formed of an electroconductive fluorine resin material, the escape routes for static electricity generated in the diaphragm will increase, thereby further enhancing the effect of suppressing the electrostatic charge of the diaphragm.

In one embodiment, the drive mechanism may include a piston housed in the drive unit housing so as to be reciprocally movable, and the stem is coupled to the piston, thereby being driven by the reciprocating movement of the piston. In this case, the piston is preferably formed of an electroconductive fluorine resin material.

In another embodiment, the diaphragm may include a valve element part contacting the valve seat, and an annular membrane part extending from the valve body, the membrane part having an outer peripheral edge portion sandwiched between the valve main body and the drive unit housing.

Furthermore, the diaphragm or the drive unit housing may be connected to a ground element allowing static electricity to escape to the outside.

The above-described electroconductive fluorine resin material is a composition containing a conductive material compounded in a fluorine resin material. For example, the conductive material may be carbon black or carbon nanotubes.

Advantageous Effect of the Invention

According to the diaphragm valve of the present invention, the drive unit housing which is in contact with a diaphragm is formed of electroconductive fluorine resin, and therefore the electrostatic charge of the diaphragm is suppressed, thereby making it possible to inhibit the particles from being adhered to the diaphragm to be enlarged. This can prevent the enlarged particles from being detached from the diaphragm and released into the fluid due to a vertical movement of the diaphragm and a sudden change in the flow velocity when the valve opens or closes, and reduce contamination of the fluid by the enlarged particles. In addition, the drive unit housing is formed of an electroconductive fluorine resin material, and therefore even if the fluid in the valve chamber leaks from the diaphragm into the drive unit housing due to damage to the diaphragm or the like, the drive unit housing is able to be prevented from being corroded by the fluid. Furthermore, the diaphragm formed of an electroconductive fluorine resin material makes it easier for the static electricity generated in the diaphragm to be released to the drive unit housing, thereby enhancing the effect of suppressing the electrostatic charge. On the other hand, when the portion being in contact with the valve seat is formed of a non-electroconductive fluorine resin material, it is possible to prevent a release of conductive materials from the diaphragm into the fluid, thereby preventing the conductive materials from having an adverse effect in applications such as the semiconductor manufacturing field.

DESCRIPTION OF EMBODIMENTS

Embodiments of a diaphragm valve according to the present invention will be described below with reference to drawings. However, it goes without saying that the present invention is not limited to the shown embodiments.

Figure 1:
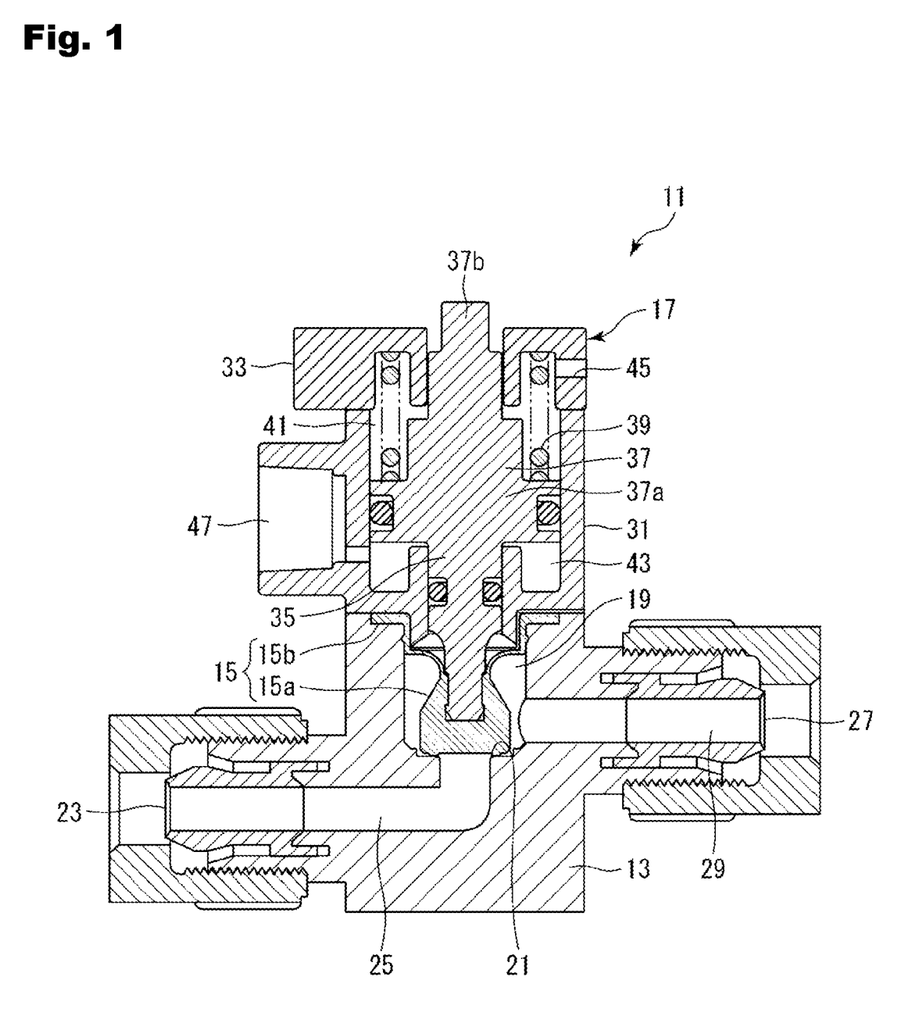
FIG. 1 is a vertical cross-sectional view showing a diaphragm valve according to a first embodiment of the present invention.

First, the overall configuration of a diaphragm valve 11 of the present invention will be described with reference to FIG. 1. The diaphragm valve 11 includes a valve main body 13, a diaphragm 15, and a drive unit 17 that drives the diaphragm 15. The drive unit 17 is attached to the upper part of the valve main body 13.

The valve main body 13 has a valve chamber 19 which is formed in the center of the upper part thereof, and a first flow passage and a second flow passage which are in communication with the valve chamber 19. In the valve chamber 19, an annular valve seat 21 that the diaphragm 15 contacts and separates from is formed in an area surrounding an opening from the first flow passage to the valve chamber 19. In the shown embodiment, there is formed as the first flow passage an inflow passage 25 extending from an inflow port 23, which is formed on one of the opposing side surfaces of the valve main body 13, and opening in the center of the bottom of the valve chamber 19. In addition, there is formed as the second flow passage an outflow passage 29 extending from an outflow port 27, which is formed on the other of the opposing side surfaces of the valve main body 13, and opening in the side surface of the valve chamber 21. There is an annular valve seat 21 formed in the area surrounding the opening from the inflow passage 25 to the valve chamber 21.

The drive unit 17 includes a drive unit housing 31 attached to the upper part of the valve main body 13 and having a mechanism housing space formed inside, a cover member 33 attached to the upper part of the drive unit housing 31, a stem 35 coupled to the diaphragm 15, and a drive mechanism housed in the mechanism housing space and driving the stem 35. In this embodiment, the drive unit housing 31 has a cylinder part formed therein, and the drive mechanism is constituted by a piston 37 housed in the cylinder part and a coil spring 39 serving as a biasing member.

The piston 37 has a piston body 37a slidably housed in the cylinder part of the drive unit housing 31, and a guide shaft 37b extending upward from the piston body 37a. The stem 35 is coupled to the piston body 37a so as to extend downward from the piston body 37a. The stem 35 is slidably inserted into a through hole provided to extend through the bottom of the drive unit housing 31, and has a tip connected to the diaphragm 15 (specifically, a valve element part 15a described later). The piston body 37a has an outer peripheral surface, which is in contact with the inner peripheral surface of the cylinder part so as to be slidable in the vertical direction, and divides the internal space of the cylinder part into an upper space 41 and a lower space 43. The upper space 41 is enclosed by the upper surface of the piston body 37a, the inner peripheral wall of the cylinder part, and the ceiling surface of the cylinder part (that is, the lower surface of the cover member 33), and the lower space 43 is enclosed by the lower surface of the piston body 37a, the inner peripheral wall of the cylinder part, and the bottom surface of the cylinder part (that is, the bottom of the drive unit housing 31). The guide shaft 37b is slidably inserted into a through hole provided to extend through the cover member 33 so that the guide shaft 37b guides the vertical movement of the piston 37.

The cover member 33 has a vent 45 being in communication with the ceiling surface of the cylinder part that defines the upper space 41, so that ventilation is able to be performed between the upper space 41 and the outside through the vent 45. In a side part of the drive unit housing 31, there is formed a working fluid supply port 47 being in communication with the bottom of the cylinder part that defines the lower space 43, so that a working fluid is able to be supplied from the working fluid supply port 47 into the lower space 43. Furthermore, a coil spring 39 is placed in a compressed state between the lower surface of the cover member 33 (the ceiling surface of the cylinder part) and the upper surface of the piston body 37a.

The drive unit 17 is placed so that the stem 35 and the guide shaft 37b of the piston 37 are perpendicular to the valve seat surface.

The diaphragm 15 includes a valve element part 15a and a membrane part 15b. The valve element part 15a has a shape like a cylinder with a truncated cone coupled thereto, and the bottom surface of the valve element part 15a is placed so as to face the valve seat 21. The membrane part 15b is formed so as to extend radially outward from the outer peripheral portion of the upper end of the valve element part 15a, and has an outer peripheral edge portion sandwiched between the upper surface of the area surrounding the upper opening of the valve chamber 19 of the valve main body 13 and the bottom surface of the drive unit housing 31.

In the diaphragm valve 11, the valve main body 13 is formed of a normal fluorine resin material (non-electroconductive fluorine resin material), while the drive unit 17 has components, which are adjacent to the diaphragm 15, formed of an electroconductive fluorine resin material. In other words, the drive unit housing 31 and the stem 35 are formed of an electroconductive fluorine resin material. It is preferable that the piston 37 to which the stem 35 is coupled, the cover member 33 attached to the drive unit housing 31, and the diaphragm 15 are also formed of an electroconductive fluorine resin material. The electroconductive fluorine resin material able to be used are, for example, a composition containing a conductive material such as carbon black or carbon nanotubes compounded in a fluorine resin material such as polyvinylidene fluoride (PVDF), polytetrafluoroethylene (PTFE), perfluoroalkoxy alkane (PFA), or polychlorotrifluoroethylene (PCTFE), in order to give conductivity. The electroconductive fluorine resin material is able to be prepared, for example, by stirring carbon black or carbon nanotubes mixed with powdered fluorine resin material, and melting the mixture.

In the shown embodiment, the valve main body 13 and the diaphragm 15 are formed of PVDF, while the drive unit housing 31, the cover member 33, the stem 35, and the piston 37 of the drive unit 17 are formed of an electroconductive fluorine resin material, which is a composition containing PVDF compounded with carbon black. However, the diaphragm 15 has a portion that undergoes repeated bending particularly at the membrane part 15b, by which preferably the diaphragm 15 has a high flex life value. Therefore, the diaphragm 15 may be formed of an electroconductive fluorine resin material, which is a composition containing PTFE compounded with conductive material such as carbon black or carbon nanotubes. The electroconductive fluorine resin material is not limited to the composition containing a fluorine resin material compounded with carbon black or carbon nanotubes, and other types of electroconductive fluorine resin materials may be used. In addition, the method of manufacturing the diaphragm 21 is not particularly limited, and the diaphragm 21 may be made by cutting or by compression molding.

In the outer peripheral edge portion of the membrane part 15b of the diaphragm 15, there may be formed a tab part (not shown) protruding and extending to the outside of the valve main body 13 while being sandwiched between the valve main body 13 and the drive unit housing 31 with a ground wire connected to the tab part. The provision of this type of tab part and the ground wire enables the static electricity generated in the diaphragm 15 to be allowed to escape to the outside through the tab part and the ground wire. The ground wire may be connected to other components of the drive unit 17, such as the drive unit housing 31 and the stem.

Next, the operation of the diaphragm valve 11 will be described below with reference to FIG. 1. As shown in FIG. 1, during normal times when a working fluid is not supplied from the working fluid supply port 47 to the drive unit 17, the piston 37 of the drive unit 17 is biased downward by the coil spring 39 and pushed down. As a result, the valve element part 15a is pressed against the valve seat 21 and the diaphragm valve 11 is closed as shown in FIG. 1. When the working fluid is supplied to the working fluid supply port 47 of the drive unit 17 in this state, the fluid pressure of the working fluid flowing into the lower space 43 of the cylinder part acts upward on the piston body 37a, and the piston 37 is pushed up against the biasing force of the coil spring 39. At this time, the air in the upper space 41 is released to the outside from the vent 45. As a result, the valve element part 15a is separated from the valve seat 21 and the diaphragm valve 11 is opened. When the supply of the working fluid to the working fluid supply port 47 is stopped, the coil spring 39 again biases the piston 37 downward and pushes it down, so that the valve element part 15a presses against the valve seat 21 to close the diaphragm valve 11 again.

Figure 2:
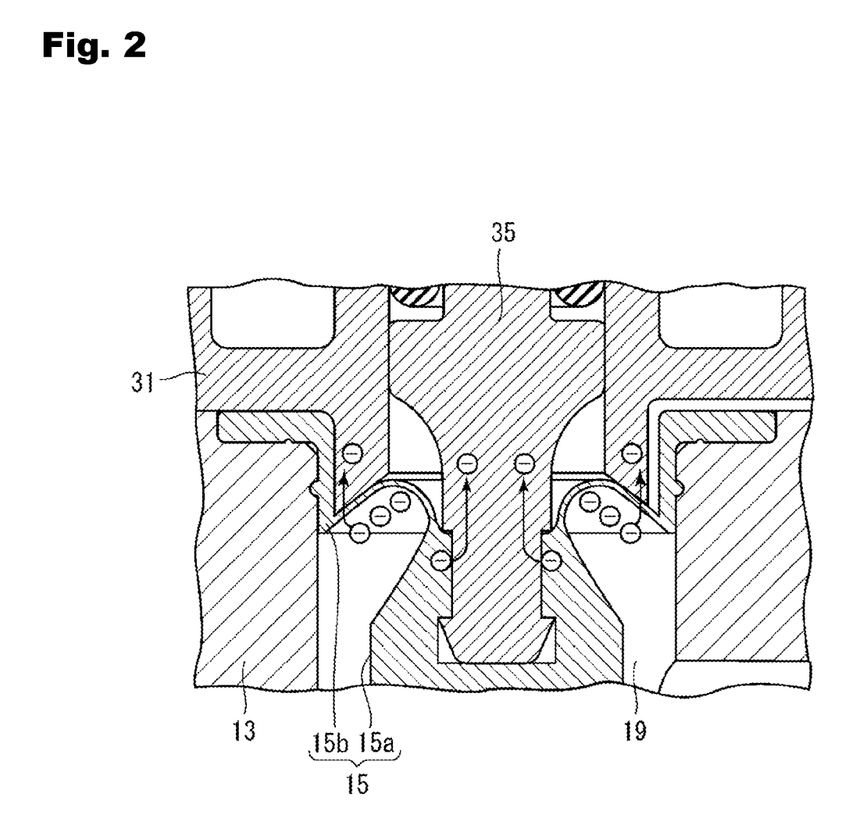
FIG. 2 is an explanatory diagram illustrating the transfer of electrons accumulated in the diaphragm valve shown in FIG. 1.

When the diaphragm valve 11 is opened and a fluid flows from the inflow passage 25 through the valve chamber 19 to the outflow passage 29, static electricity may be generated in the diaphragm valve 11 by a friction between the fluid and the inner peripheral surfaces of the inflow passage 25 and the outflow passage 29, the inner wall of the valve chamber 19, and the diaphragm 15. Particularly in the corners of the valve chamber 19 and in the vicinity of the diaphragm 15, the fluid tends to stay, and the particles in the fluid are easily attracted and adhere to the corners and the diaphragm 15 to grow and to be enlarged. In addition, the diaphragm 15, particularly the membrane part 15b thereof, moves or bends greatly when the valve opens or closes, so that enlarged particles are easily detached from the diaphragm 15 and causes contamination of the fluid. Therefore, if the diaphragm valve 11 is used, for example, on a fluid line that is used for cleaning semiconductors, enlarged particles may be released into the fluid and may damage the wafer. In order to solve the above problem, the components of the drive unit 17 adjacent to the diaphragm 15, more specifically, the drive unit housing 31, the stem 35, the piston 37 coupled to the stem 35, and the cover member 33 are formed of an electroconductive fluorine resin material in the diaphragm valve 11. Therefore, even if the valve main body 13 and the diaphragm 15 are formed of an insulating material, the static electricity (electrons) generated in the diaphragm 15 is diffused to the drive unit housing 31, the stem 35, and the like, as shown in FIG. 2. Particularly in the thin membrane part 15b, electrons move easily, thus achieving a large effect of diffusing static electricity from the membrane part 15b. Therefore, static electricity is less likely to accumulate in the diaphragm 15 and the electrostatic charge is suppressed. As a result, particles such as impurities in the fluid are less likely to adhere to the diaphragm 15, particularly to the membrane part 15b, thereby suppressing the enlargement of the particles and enabling a reduction in the contamination of the fluid caused by enlarged particles.

When a ground wire extending to the outside of the drive unit housing 31 of the drive unit 17 is connected to the diaphragm 15 or the drive unit 17 (specifically, the drive unit housing 31 or the stem 35), static electricity is allowed to escape to the outside. Therefore, the electrostatic charge of the diaphragm 15 is suppressed more effectively, and the effect of reducing contamination of the fluid by enlarged particles is further enhanced. However, the ground wire is not essential, and the above effects can be achieved even if the ground wire is not provided.

As described above, the diaphragm 15 has the membrane part 15b moving or bending so that the valve element part 15a is pressed against or separated from the valve seat 21 to close or open the diaphragm valve 11. Due to the impact and friction caused when the valve element part 15a comes into contact with the valve seat 21 as described above, particles are easily generated from the valve element part 15a. Therefore, if the diaphragm 15 is formed of an electroconductive fluorine resin material which contains a conductive material, such as carbon black or carbon nanotubes, compounded in PTFE, the conductive material contained in the electroconductive fluorine resin material may be released into the fluid from the valve element part 15a that comes in contact with the valve seat 21. Particularly in the field of semiconductor manufacturing or the like, if a conductive material is contained in the fluid used in the manufacturing process (for example, cleaning process), an adverse effect may occur.

Figure 3:
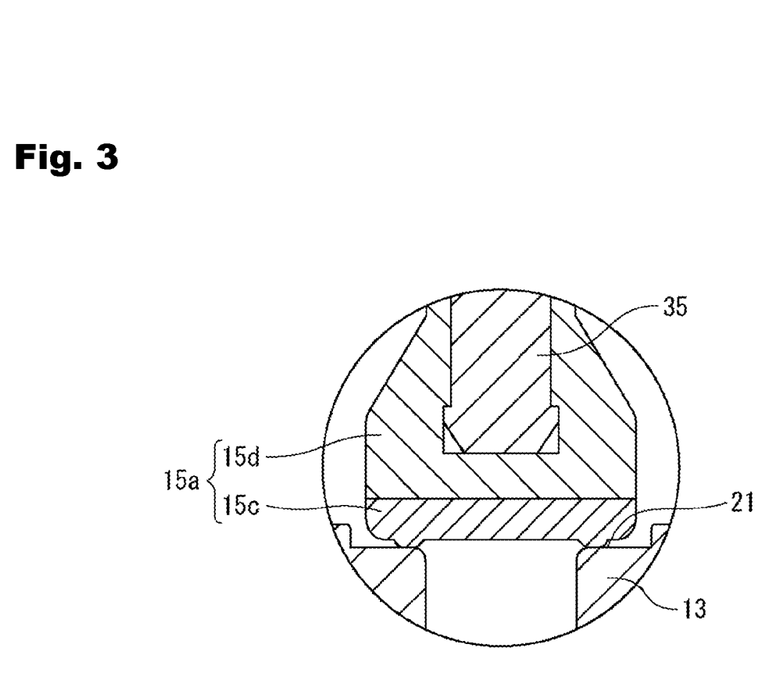
FIG. 3 is an enlarged view showing a diaphragm of a modification of the diaphragm valve according to the first embodiment shown in FIG. 1.

Therefore, in the case where it is required to prevent the release of the conductive material into the fluid in the field of semiconductor manufacturing or the like, it is preferable that a portion (hereinafter, referred to as a contact portion) 15c of the valve element part 15a of the diaphragm 15 coming in contact with the valve seat 21 is formed of a non-electroconductive fluorine resin material, while the other residual portion (hereinafter, referred to as the non-contact portion) 15d is formed of an electroconductive fluorine resin material, as in a modification shown in FIG. 3. For example, the contact portion 15c is formed of PTFE, while the non-contact portion 15d is formed of PTFE compounded with carbon black. This enables prevention of the release of conductive material from the diaphragm 15 into the fluid. The contact portion 15c and the non-contact portion 15d may be individually molded and then integrally joined by adhesion or the like, or may be integrally molded by so-called multicolor molding (multicolor compression molding).

The application of the present invention is not limited to the configuration of the diaphragm valve 11 of the first embodiment.

Figure 4:
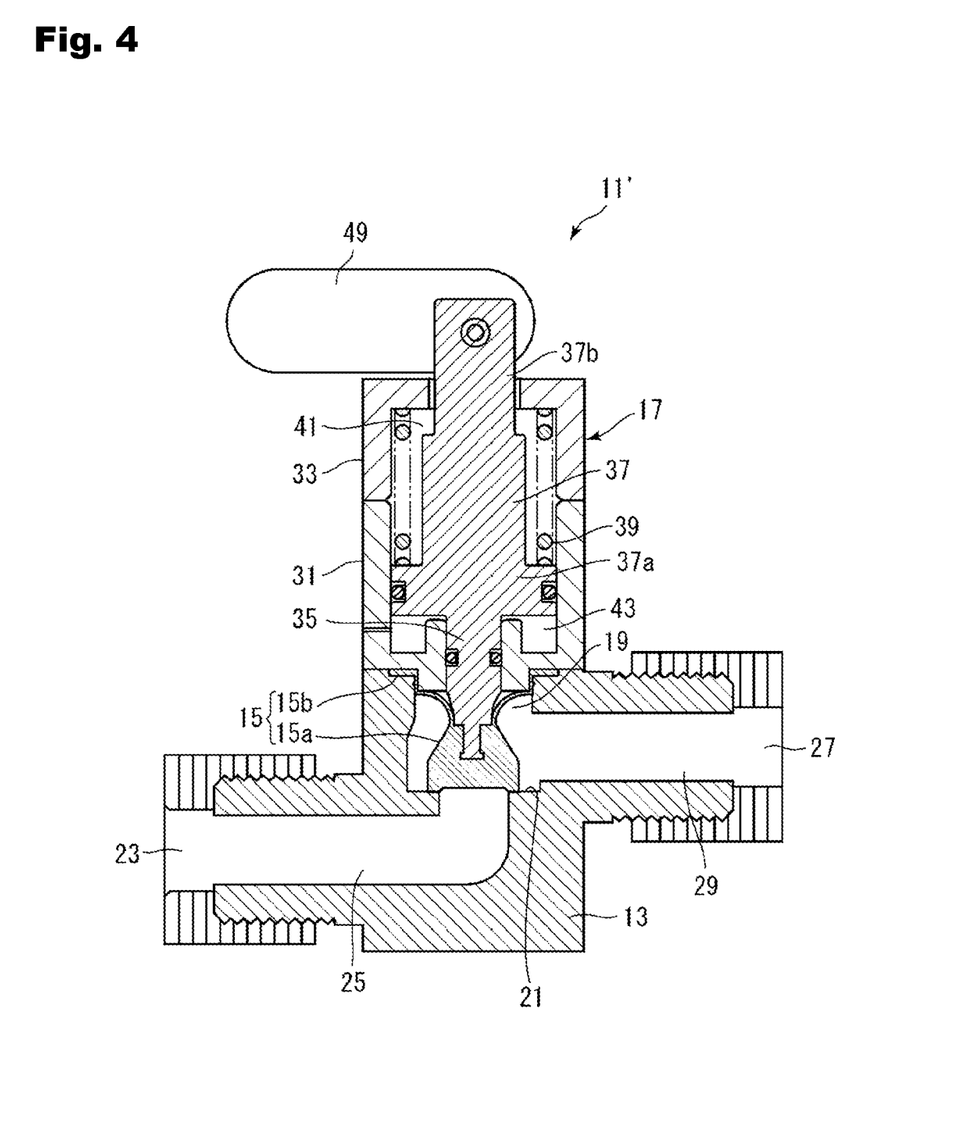
FIG. 4 is a vertical cross-sectional view showing a toggle valve as a diaphragm valve according to a second embodiment of the present invention.

FIG. 4 shows a toggle valve 11' according to a second embodiment of the present invention. The toggle valve 11' shown in FIG. 4 has the same configuration as that of the diaphragm valve 11, except that a lever 49 is manually operated to move the piston 37 up and down in the toggle valve 11', whereas the working fluid moves the piston 37 up and down in the diaphragm valve 11. Therefore, the same components as those of the diaphragm valve 11 shown in FIG. 1 are denoted by the same reference numerals. Differences between the toggle valve 11' and the diaphragm valve 11 will be mainly described below.

The toggle valve 11' includes a valve main body 13, a diaphragm 15, and a drive unit 17 driving the diaphragm 15, and the drive unit 17 is attached to the upper part of the valve main body 13. The valve main body 13 has a valve chamber 19 formed in the center of the upper part thereof, and has an inflow passage 25, which extends from an inflow port 23 formed in one side surface of the valve main body 13 and opens in the center of the bottom of the valve chamber 19, and an outflow passage 29, which extends from an outflow port 27 formed in the other side surface of the valve main body 13 and opens in the side surface of the valve chamber 21. There is an annular valve seat 21 formed in the area surrounding the opening from the inflow passage 25 to the valve chamber 19, where the diaphragm 15 contacts and separates from the annular valve seat 21.

The drive unit 17 includes a drive unit housing 31 attached to the upper part of the valve main body 13 and has a cylinder part formed therein as a mechanism housing space, a cover member 33 attached to the upper part of the drive unit housing 31, a stem 35 coupled to the diaphragm 15, and a drive mechanism housed in the cylinder part and used to drive the stem 35. The drive mechanism is constituted by a piston 37 housed in the cylinder part and a coil spring 39 serving as a biasing member. The piston 37 has a piston body 37a slidably housed in the cylinder part of the drive unit housing 31, and a guide shaft 37b extending upward from the piston body 37a. The stem 35 is coupled to the piston body 37a so as to extend downward from the piston body 37a. The stem 35 is slidably inserted into a through hole provided to extend through the bottom of the drive unit housing 31, and has a tip connected to the diaphragm 15 (specifically, the valve element part 15a thereof). The piston body 37a has an outer peripheral surface, which is in contact with the inner peripheral surface of the cylinder part so as to be slidable in the vertical direction, and divides the internal space of the cylinder part into an upper space 41 and a lower space 43. The upper space 41 is enclosed by the upper surface of the piston body 37a, the inner peripheral wall of the cylinder part, and the ceiling surface of the cylinder part (that is, the lower surface of the cover member 33), and the lower space 43 is enclosed by the lower surface of the piston body 37a, the inner peripheral wall of the cylinder part, and the bottom surface of the cylinder part (that is, the bottom of the drive unit housing 31). The guide shaft 37b is slidably inserted into a through hole provided to extend through the cover member 33, so that the guide shaft 37b guides the vertical movement of the piston 37. In addition, the coil spring 39 is placed in a compressed state between the lower surface of the cover member 33 (the ceiling surface of the cylinder part) and the upper surface of the piston body 37a.

The lever 49 is attached to an end of the guide shaft 37b so as to be turnable, so that turning of the lever 49 enables the piston body 37a to be moved up and down via the guide shaft 37b by a cam action. Specifically, by turning the lever 49 to an upright state, the piston body 37a is able to be moved upward via the guide shaft 37b against the biasing force of the coil spring 39 by the cam action. By turning the lever 49 to a laid state, the force applied from the lever 49 to the piston body 37a is eliminated, so that the biasing force of the coil spring 39 moves the piston body 37a downward.

The diaphragm 15 includes a valve element part 15a and a membrane part 15b. The valve element part 15a has a shape like a cylinder with a truncated cone coupled thereto, and the bottom surface of the valve element part 15a is placed so as to face the valve seat 21. The membrane part 15b is formed so as to extend radially outward from the outer peripheral portion of the upper end of the valve element part 15a, and has an outer peripheral edge portion of the membrane part sandwiched between the upper surface of the area surrounding the upper opening of the valve chamber 19 of the valve main body 13 and the bottom surface of the drive unit housing 31.

In the toggle valve 11', the drive unit 17 has components, which are adjacent to the diaphragm 15, formed of an electroconductive fluorine resin material, as in the diaphragm valve 11. In other words, the drive unit housing 31 and the stem 35 are formed of an electroconductive fluorine resin material. It is preferable that the piston 37 to which the stem 35 is coupled and the cover member 33 attached to the drive unit housing 31 are also formed of an electroconductive fluorine resin material. In addition, it is preferable that the diaphragm 15 is also formed of an electroconductive fluorine resin material. The details and effects of the electroconductive fluorine resin material are the same as those of the diaphragm valve 11, and therefore the description thereof is omitted here.

Furthermore, also in the toggle valve 11', the valve element part 15a of the diaphragm 15 may be constituted by a contact portion 15c and a non-contact portion 15d, and the contact portion 15c may be formed of a non-electroconductive fluorine resin material, while the non-contact portion 15d may be formed of an electroconductive fluorine resin material, as in the diaphragm valve 11.

In addition, as long as the valve uses a diaphragm, the present invention is applicable to other type of valves, such as a constant pressure valve or a sackback valve. Even in this case, the components adjacent to the diaphragm 15 may be formed of an electroconductive fluorine resin material and the diaphragm 15 may be formed of an electroconductive fluorine resin material, in the drive unit 17 that drives the diaphragm 15 without contacting the fluid. Also in this case, the valve element part 15a of the diaphragm 15 may be constituted by a contact portion 15c and a non-contact portion 15d, and the contact portion 15c may be formed of a non-electroconductive fluorine resin material and the non-contact portion 15d may be formed of an electroconductive fluorine resin material.

EXAMPLES

Table 1 lists test results of the number of detected particles, with respect to Examples of the diaphragm valve 11 in which the valve main body 13 and the diaphragm 15 are made of PVDF and the drive unit 17 (specifically, the drive unit housing 31, the cover member 33, the stem 35, and the piston 37) is made of electroconductive fluorine resin material which is a composition containing 20% by weight (20 wt. %) carbon black compounded in PVDF used as the fluorine resin material, and with respect to Comparative Examples of a diaphragm valve having the same configuration as the diaphragm valve 11, wherein all of the valve main body 13, the diaphragm 15, and the drive unit 17 are made of PVDF. Examples 1 and 2 are diaphragm valves 11 with no ground wire available, and Examples 3 and 4 are diaphragm valves 11 with a ground wire provided in the upper part of the drive unit 17, specifically the cover member 33 thereof. Examples 1 and 3 are cases in which measurement is performed while continuing an open/close mode, in which an open state for 3 seconds and a closed state for 1 second are repeated, for 30 minutes. Examples 2 and 4 are cases in which measurement is performed while continuing an open mode, in which the open state is continued, for 30 minutes. In the test, after removing electricity of the surface of the diaphragm valve with isopropyl alcohol before starting the test, pure water was distributed to the diaphragm valve, and the number of particles contained in the pure water was measured by a particle counter located in the downstream of the diaphragm valve. The measurements are compared with the number of particles detected in Comparative Example 1 set to 100.

TABLE 1

|  | Operation mode | Ground wire | Number of particles |
|---|---|---|---|
| Comparative Example 1 | Open/close | not available | 100 |
| Comparative Example 2 | Open | not available | 51 |
| Example 1 | Open/close | not available | 69 |
| Example 2 | Open | not available | 49 |
| Example 3 | Open/close | available | 38 |
| Example 4 | Open | available | 23 |

From the test results of Comparative Examples 1 and 2, Examples 1 and 2, and Examples 3 and 4, it was confirmed that the number of particles detected in the open/close mode is larger than that in the open mode and that the opening and closing of the valve makes it easier to generate enlarged particles detectable by the particle counter. In addition, based on the comparison between the test results of Comparative Examples 1 and 2 and the test results of Examples 1 and 2, the number of enlarged particles detected by the particle counter in the diaphragm valve 11 of the present invention having the drive unit 17 made of an electroconductive fluorine resin material, even with no ground wire, is less than the number of enlarged particles detected by the particle counter in the normal diaphragm valve having a drive unit formed of a non-electroconductive fluorine resin material, by which a reduction effect achieved by suppressing the electrostatic charge was confirmed in the generation of enlarged particles. Furthermore, based on the comparison between the test results of Examples 1 and 2 and the test results of Examples 3 and 4, the number of enlarged particles detectable by the particle counter is further decreased by providing a ground wire even in the case where the drive unit 17 is made of electroconductive fluorine resin material, by which an increase in a reduction effect achieved by suppressing the electrostatic charge was confirmed in the generation of enlarged particles.

Although the diaphragm valve according to the present invention has been described above with reference to the shown embodiments, the present invention is not limited to the shown embodiments. For example, in the shown embodiments, the ground wire is not provided, but the ground wire may be connected to the diaphragm 15 or the drive unit housing 31. In the embodiments, the diaphragm 15 is formed of a non-electroconductive fluorine resin material, but the diaphragm 15 may be formed of an electroconductive fluorine resin material similarly to the drive unit 17.

DESCRIPTION OF REFERENCE NUMERALS

11 Diaphragm valve
11' Toggle valve
13 Valve main body
15 Diaphragm
15a Valve element part
15b Membrane part
15c Contact portion
15d Non-contact portion
17 Drive unit
19 Valve chamber
25 Inflow passage
29 Outflow passage
31 Drive unit housing
35 Stem

The invention claimed is:

1. A diaphragm valve comprising:
a valve main body having formed therein a valve chamber, and a first flow passage and a second flow passage being in communication with the valve chamber;
an annular valve seat formed in the valve chamber;
a diaphragm contacting and separating from the valve seat to switch opening and closing between the first flow passage and the second flow passage, said diaphragm including a valve element part contacting the valve seat and an annular membrane part extending from the valve element part; and
a drive unit driving the diaphragm, and including a drive unit housing attached to the valve main body so that an outer peripheral edge portion of the diaphragm is sandwiched between the valve main body and the drive unit housing,
wherein the valve element part includes a contact portion coming in contact with the valve seat and a residual portion, said contact portion being formed of a non-electroconductive fluorine resin material, said residual portion of the valve element part and the membrane part being formed of an electroconductive fluorine resin material, and
the drive unit housing is formed of an electroconductive fluorine resin material.

2. The diaphragm valve according to claim 1, wherein the drive unit further includes a stem coupled to the diaphragm and a drive mechanism for driving the stem, and the stem is formed of an electroconductive fluorine resin material.

3. The diaphragm valve according to claim 2, wherein all components of the drive unit adjacent to the diaphragm are formed of an electroconductive fluorine resin material.

4. The diaphragm valve according to claim 3, wherein the drive mechanism further includes a piston housed in the drive unit housing so as to be reciprocally movable, and the stem is coupled to the piston to be driven by reciprocating movement of the piston.

5. The diaphragm valve according to claim 4, wherein the piston is formed of an electroconductive fluorine resin material.

6. The diaphragm valve according claim 1, wherein the membrane part includes the outer peripheral edge portion sandwiched between the valve main body and the drive unit housing.

7. The diaphragm valve according to claim 1, wherein the diaphragm or the drive unit housing is connected to a ground element allowing static electricity to escape to an outside.

8. The diaphragm valve according to claim 1, wherein the electroconductive fluorine resin material comprises a composition containing a conductive material compounded in a fluorine resin material.

9. The diaphragm valve according to claim 8, wherein the conductive material is carbon black or carbon nanotubes.

10. The diaphragm valve according to claim 1, wherein the membrane part moves or bends when the diaphragm contacts and separates from the valve seat,
the contact portion is arranged at one end of the diaphragm to contact the valve seat and the residual portion extends from the contact portion to the membrane part, and
only the contact portion is formed of the non-electroconductive fluorine resin material to prevent from releasing a conductive material contained in the electroconductive fluorine resin material into fluid flowing the valve chamber through the contact portion.

11. The diaphragm valve according to claim 10, wherein the non-electroconductive fluorine resin material is PTFE, and the electroconductive fluorine resin material is PTFE compounded with carbon black.

* * * * *